United States Patent
Kim et al.

(10) Patent No.: US 9,012,347 B2
(45) Date of Patent: Apr. 21, 2015

(54) METHOD FOR PREPARING SUPPORTED HYBRID METALLOCENE CATALYST

(75) Inventors: Hyeon-Gook Kim, Daejeon (KR); Ki-Soo Lee, Daejeon (KR); Dae-Sik Hong, Daejeon (KR); Eun-Kyoung Song, Daejeon (KR); Man-Seong Jeon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 37 days.

(21) Appl. No.: 13/824,935

(22) PCT Filed: Sep. 28, 2011

(86) PCT No.: PCT/KR2011/007143
§ 371 (c)(1),
(2), (4) Date: Jun. 7, 2013

(87) PCT Pub. No.: WO2012/044063
PCT Pub. Date: Apr. 5, 2012

(65) Prior Publication Data
US 2013/0253154 A1    Sep. 26, 2013

(30) Foreign Application Priority Data
Sep. 29, 2010 (KR) .................. 10-2010-0094504

(51) Int. Cl.
| | |
|---|---|
| C08F 4/02 | (2006.01) |
| C08F 4/642 | (2006.01) |
| C08F 4/6592 | (2006.01) |
| C08F 10/00 | (2006.01) |
| C08F 4/659 | (2006.01) |
| B01J 31/16 | (2006.01) |
| B01J 31/22 | (2006.01) |

(52) U.S. Cl.
CPC .............. *C08F 4/6592* (2013.01); *C08F 10/00* (2013.01); *C08F 4/65912* (2013.01); *B01J 31/1616* (2013.01); *B01J 31/2295* (2013.01); *C08F 4/65925* (2013.01); *C08F 2420/02* (2013.01); *Y10S 526/943* (2013.01)

(58) Field of Classification Search
CPC ...... C08F 4/42; C08F 4/65912; C08F 4/6592; C08F 4/02; C08F 4/65925; C08F 4/65927
USPC ................ 502/103, 114, 120, 152, 155, 104; 526/129, 160, 161, 165, 348, 943
See application file for complete search history.

(56) References Cited

U.S. PATENT DOCUMENTS

| | | | |
|---|---|---|---|
| 4,912,075 A | 3/1990 | Chang | |
| 4,935,397 A * | 6/1990 | Chang | 502/117 |
| 5,057,475 A * | 10/1991 | Canich et al. | 502/104 |
| 6,124,229 A | 9/2000 | Becker et al. | |
| 2006/0183631 A1* | 8/2006 | Lee et al. | 502/117 |
| 2010/0121006 A1* | 5/2010 | Cho et al. | 526/90 |

FOREIGN PATENT DOCUMENTS

| | | |
|---|---|---|
| JP | 2003-533550 A | 11/2003 |
| KR | 10-1996-0005917 B1 | 5/1996 |
| KR | 10-1998-0063068 A | 10/1998 |
| KR | 10-2004-0085650 A | 10/2004 |
| KR | 10-2006-0091528 A | 8/2006 |
| KR | 10-2009-0063799 A | 6/2009 |
| WO | 2009029857 A1 | 3/2009 |

OTHER PUBLICATIONS

Smit, M. et al., "Effects of Methylaluminoxane Immobilization on Silica on the Performance of Zirconocene Catalysts in Propylene Polymerization." In: J. Polym. Sci. Part A: Polym. Chem., 2005, vol. 43, pp. 2734-2748.

* cited by examiner

*Primary Examiner* — Caixia Lu
(74) *Attorney, Agent, or Firm* — McKenna Long & Aldridge LLP

(57) ABSTRACT

The present invention relates to a preparation method of a metallocene catalyst. More particularly, the present invention relates to a preparation method of a supported hybrid metallocene catalyst, including the steps of treating a support having a water content of 4 to 7% by weight with trialkyl aluminum at a predetermined temperature; supporting alkyl aluminoxane on the support; and supporting a metallocene compound on the alkyl aluminoxane-supported support. According to the present invention, it is possible to prepare a supported hybrid metallocene catalyst which shows a high activity in the polymerization of olefins and enables the preparation of polyolefins having a high bulk density, by a simple process.

9 Claims, No Drawings

METHOD FOR PREPARING SUPPORTED HYBRID METALLOCENE CATALYST

This application is a National Stage Entry of International Application No. PCT/KR2011/007143, filed Sep. 28, 2011, and claims the benefit of Korean Application No. 10-2010-0094504 filed on Sep. 29, 2011 all of which are hereby incorporated by reference in their entirety for all purposes as if fully set forth herein.

TECHNICAL FIELD

The present invention relates to a preparation method of supported hybrid metallocene catalyst.

BACKGROUND OF ART

General polymerization techniques of olefins are classified into high pressure process, solution process, slurry process, and gas phase process, and many attempts have been made to produce polyolefins having desired physical properties by varying the type of the metallocene catalyst according to one of those techniques.

In the polymerization process of olefins, continuous operation of a reactor causes fouling associated with polymer deposition on the wall of the reactor, which can be prevented to a certain extent by using a supported metallocene catalyst as a catalyst. In addition, the use of supported metallocene catalyst increases apparent density of polyolefins so as to increase the yield per unit volume of the reactor.

In the previous methods of preparing the supported metallocene catalysts, a support having a water content of 1% by weight or less prepared by calcination (drying) at 200 to 800° C. has been mainly used in order to form a highly reactive siloxane group on the surface of the support. However, this method is problematic in that the calcination process complicates the catalyst preparation process, and therefore the catalytic activity is also insufficient.

For this reason, a variety of studies have been conducted in order to increase the catalytic activity. In many cases, however, when it is intended to increase the catalytic activity, there are problems that the catalyst preparation process becomes complex, or bulk density or physical properties of polyolefins prepared by using the supported catalyst become(s) insufficient.

DETAILED DESCRIPTION OF THE INVENTION

Technical Problem

Accordingly, the present invention provides a simple preparation method of a supported hybrid metallocene catalyst which exhibits a high activity in the polymerization of olefins and enables the polymerization of polyolefins having a high bulk density.

Technical Solution

The present invention provides a preparation method of a supported hybrid metallocene catalyst, including the steps of: treating a support having a water content of approximately 4 to 7% by weight with trialkyl aluminum at a temperature of approximately 60 to 100° C.; supporting alkyl aluminoxane on the support; and supporting a metallocene compound on the alkyl aluminoxane-supported support.

In this regard, the support may include a hydroxy group of approximately 2 to 4 mmol/g on the surface.

Further, a molar ratio of trialkyl aluminium and alkyl aluminoxane may be approximately 1:10 to 1:30.

Further, a loading amount of alkyl aluminoxane on the support may be approximately 6 to 20 mmol/g.

Further, a loading amount of the metallocene compound on the support may be approximately 0.1 to 0.5 mmol/g.

The step of supporting alkyl aluminoxane may be performed at a temperature of approximately 40 to 80° C.

Meanwhile, the support may be one or more selected from the group consisting of silica, silica-alumina, and silica-magnesia.

Further, the trialkyl aluminium may be one or more selected from the group consisting of trimethyl aluminium, triethyl aluminium, and tributyl aluminium.

Further, the alkyl aluminoxane may be one or more selected from the group consisting of methylaluminoxane, ethylaluminoxane, butylaluminoxane, and isobutylaluminoxane.

The metallocene compound may be one or more selected from the group consisting of the following Chemical Formulae 1 to 3:

[Chemical Formula 1]

wherein M is a Group 4 transition metal;

$(C_5R^a)$ and $(C_5R^b)$ are each independently a Group 14 metalloid, cyclopentadienyl ligand that is substituted with one or more selected from the group consisting of hydrogen, alkyl, cycloalkyl, aryl, alkenyl, alkylaryl, arylalkyl, arylalkenyl and hydrocarbyl, or a cyclopentadienyl ligand, in which two neighboring carbon atoms in $C_5$ are connected to each other through hydrocarbyl to form one or more rings having 4 to 16 carbon atoms;

Q is a halogen atom, alkyl, alkenyl, aryl, alkylaryl, arylalkyl or alkylidene;

p is 0 or 1;

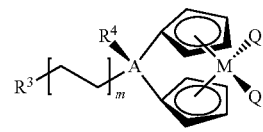
[Chemical Formula 2]

wherein M is a Group 4 transition metal;

$R^3$ and $R^4$ are each independently hydrogen, alkyl having 1 to 20 carbon atoms, alkenyl having 2 to 20 carbon atoms, aryl having 6 to 20 carbon atoms, alkylaryl having 7 to 40 carbon atoms, arylalkyl having 7 to 40 carbon atoms, alkylsilyl having 1 to 20 carbon atoms, arylsilyl having 6 to 20 carbon atoms, methoxymethyl, t-butoxymethyl, tetrahydropyranyl, tetrahydrofuranyl, 1-ethoxyethyl, 1-methyl-1-methoxyethyl, or t-butyl;

A is alkylene having 2 to 4 carbon atoms, alkylsilicon having 1 to 4 carbon atoms, alkylgermanium having 1 to 4 carbon atoms, alkylphosphine having 1 to 4 carbon atoms or alkylamine having 1 to 4 carbon atoms;

Q is each independently a halogen atom, alkyl having 1 to 20 carbon atoms, alkenyl having 2 to 10 carbon atoms, alkylaryl having 7 to 40 carbon atoms, arylalkyl having 7 to 40 carbon atoms, aryl having 6 to 20 carbon atoms, substituted or unsubstituted alkylidene having 1 to 20 carbon atoms, substituted or unsubstituted amino group, alkylalkoxy having 2 to 20 carbon atoms or arylalkoxy having 7 to 40 carbon atoms;

m is an integer of 0 to 10;

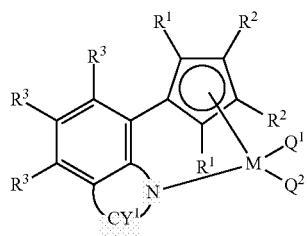

[Chemical Formula 3]

wherein $R^1$ and $R^2$ are each independently hydrogen, alkyl having 1 to 20 carbon atoms, alkenyl having 2 to 20 carbon atoms, aryl having 6 to 20 carbon atoms, silyl having 6 to 20 carbon atoms, alkylaryl having 7 to 20 carbon atoms, arylalkyl having 7 to 20 carbon atoms or a Group 14 metalloid substituted with hydrocarbyl; $R^1$ and $R^2$, or two $R^2$s may be connected to each other by alkylidine containing alkyl having 1 to 20 carbon atoms or aryl having 6 to 20 carbon atoms so as to form a ring;

$R^3$s are each independently hydrogen, a halogen atom, alkyl having 1 to 20 carbon atoms, alkenyl having 2 to 20 carbon atoms, aryl having 6 to 20 carbon atoms, alkylaryl having 7 to 20 carbon atoms, arylalkyl having 7 to 20 carbon atoms, alkoxy having 1 to 20 carbon atoms, aryloxy having 6 to 20 carbon atoms or amido; two or more of $R^3$s may be connected to each other so as to form an aliphatic or aromatic ring;

$CY^1$ is a substituted or unsubstituted aliphatic or aromatic ring, in which the substituent in $CY^1$ is a halogen atom, alkyl having 1 to 20 carbon atoms, alkenyl having 2 to 20 carbon atoms, aryl having 6 to 20 carbon atoms, alkylaryl having 7 to 20 carbon atoms, arylalkyl having 7 to 20 carbon atoms, alkoxy having 1 to 20 carbon atoms, aryloxy having 6 to 20 carbon atoms, or amido; when a plurality of substituents are present, two or more of the substituents may be connected to each other so as to form an aliphatic or aromatic ring;

M is a Group 4 transition metal; and $Q^1$ and $Q^2$ are each independently halogen, alkyl having 1 to 20 carbon atoms, alkenyl having 2 to 20 carbon atoms, aryl having 6 to 20 carbon atoms, alkylaryl having 7 to 20 carbon atoms, arylalkyl having 7 to 20 carbon atoms, alkylamido having 1 to 20 carbon atoms, arylamido having 6 to 20 carbon atoms or alkylidene having 1 to 20 carbon atoms.

Further, the present invention provides a supported hybrid metallocene catalyst that is prepared according to the above mentioned method, and a preparation method of polyolefins using the same.

Advantageous Effects

According to the present invention, it is possible to prepare a supported hybrid metallocene catalyst showing excellent catalytic activity in olefin polymerization in an inexpensive and simple manner. Furthermore, use of the supported hybrid metallocene catalyst enables preparation of polyolefins having a high bulk density and excellent physical properties for industrial applications.

DETAILED DESCRIPTION OF THE EMBODIMENTS

Hereinafter, a preparation method of a supported hybrid metallocene catalyst according to embodiments of the present invention will be described.

Unless otherwise specified throughout the specification, 'water content' of a support is defined as a percentage of the weight of water contained in the support with respect to the total weight of the support.

According to one embodiment of the present invention, provided is a preparation method of a supported hybrid metallocene catalyst, including the steps of treating a support having a water content of approximately 4 to 7% by weight with trialkyl aluminum at a temperature of approximately 60 to 100° C.;

supporting alkyl aluminoxane on the support; and supporting a metallocene compound on the alkyl aluminoxane-supported support.

In the preparation method, a support having a water content of approximately 4 to 7% by weight is used, and the support is treated with trialkyl aluminum at a temperature of approximately 60 to 100° C. Thereafter, alkyl aluminoxane as a cocatalyst and a metallocene compound as a main catalyst are sequentially supported on the treated support so as to prepare a supported hybrid metallocene catalyst.

As supported by the after-mentioned Examples, it was found that a supported catalyst showing superior catalytic activity to the previously known supported catalysts can be prepared by this preparation method. Further, it was found that use of the supported catalyst prepared by the method enables preparation of polyolefins having a high bulk density of approximately 0.38 g/ml or higher, for example, approximately 0.38 to 0.42 g/ml and excellent physical properties for industrial applications.

It is inferred that these results are attributed to the following action mechanism.

The support having a water content of approximately 4 to 7% by weight refers to a support such as silica or the like, which is not dried or calcined at a high temperature. A plurality of pores containing a predetermined amount of water may be present in this support. It is inferred that when the support is treated with trialkyl aluminium at a temperature of approximately 60 to 100° C., for example, at a temperature of approximately 70 to 90° C. or approximately 80 to 100° C., water in the support and trialkyl aluminium are reacted to produce a compound having a co-catalytic activity. This product is present in the pores inside the support to make polymerization of olefins occur on the surface of the support as well as in the pores of the support. As a result, the available area of the supported catalyst, where the polymerization occurs, and the available amount of the cocatalyst can be greatly increased. Therefore, the supported catalyst obtained by the preparation method of one embodiment shows excellent activity and also enables preparation of polyolefins having a higher bulk density.

Meanwhile, the previously known supported catalysts were provided by drying or calcining a support having a predetermined water content at a high temperature to obtain a support having a water content of approximately 1% by weight or less, and then supporting alkyl aluminoxane as a cocatalyst and a metallocene compound as a main catalyst on the support. The high-temperature drying or calcination may be performed to form a siloxane group on the surface of the support, thereby properly supporting the cocatalyst. According to this preparation method, however, the high-temperature drying or calcination makes the preparation process of supported catalyst complex, and increases the production cost and energy consumption. In addition, polymerization may occur only on the cocatalyst-supported surface, and thus there is a limitation in increasing the activity of the supported catalyst. When it is intended to improve the activity by increasing the amount of the cocatalyst supported on the surface, the bulk density of polyolefin or the catalytic activity is decreased in many cases.

Compared to the previous preparation method, the supported catalyst prepared by one embodiment shows excellent catalytic activity and also enables preparation of polyolefins having a high bulk density.

Hereinafter, each step included in the preparation method of one embodiment will be described in more detail.

First, the preparation method of a supported hybrid metallocene catalyst according to one embodiment includes the step of treating the surface of the support having a water content of 4 to 7% by weight with trialkyl aluminium. This step may be performed at a temperature of approximately 60 to 100° C., for example, at a temperature of approximately 70 to 90° C. or approximately 80 to 100° C. for proper reaction between water in the support and trialkyl aluminium.

In the previous preparation method of a supported catalyst, the supports that were dried or calcined at a high temperature to have a water content of approximately 1% by weight or less have been used, in order to form a highly reactive siloxane group on the surface of the support.

However, the support used in the preparation method of one embodiment contains water within a predetermined range, and may have a water content of approximately 4 to 7% by weight, for example, approximately 5 to 6.5% by weight. Preferably, the support has a water content of approximately 4% by weight or higher, in order to achieve a minimal improvement in the catalytic activity. Preferably, the support has a water content of approximately 7% by weight or lower, in order to prevent a reduction in the catalytic activity due to an excessive amount of water in the support.

In the preparation method of one embodiment, the support that does not undergo the above mentioned high-temperature drying or calcination to have a water content approximately 4 to 7% by weight can be used as it is. Therefore, the catalyst can be prepared by a simpler process and the production cost can be also reduced. In addition, the support that undergoes calcination but contains water within the above range by addition of water can be used. However, the support that does not undergo calcination is more preferred in terms of its production cost.

Further, as the support has a water content within the above mentioned range, the support may contain a hydroxy group of approximately 2 to 4 mmol/g, for example, a hydroxy group of approximately 2.5 to 3.5 mmol/g on the surface.

Such support may be one or more selected from the group consisting of silica, silica-alumina and silica-magnesia, and for example, silica. In addition, as long as the support satisfies the above range of water content, any support can be used without limitation.

Meanwhile, the step of treating the support is a pretreatment step for increasing the loading efficiency of the after-mentioned alkyl aluminoxane (cocatalyst) and metallocene compound (main catalyst) and improving their catalytic activity. In the preparation method of one embodiment, the support having a predetermined water content is used and the support is also treated with trialkyl aluminium at a predetermined temperature. Thus, a supported hybrid metallocene catalyst having high activity can be prepared in a simpler manner, compared to the previous preparation methods using a support that is calcined at a high-temperature.

In this regard, trialkyl aluminium may be one or more selected from the group consisting of trimethyl aluminium (TMA1), triethyl aluminium (TEA1) and tributyl aluminium (TBA1), and for example, triethyl aluminium (TEA1).

In the step of treating the support, a solvent may be used to facilitate contact of the support with trialkyl aluminium, or the reaction may be allowed in the absence of a solvent. The solvent may include aliphatic hydrocarbons such as hexane, pentane, and heptane; aromatic hydrocarbons such as toluene and benzene; chlorine-substituted hydrocarbons such as dichloromethane; ethers such as diethyl ether and tetrahydrofuran (THF); all common organic solvents such as acetone and ethyl acetate. Preferably, the solvent may be hexane, heptanes, toluene or dichloromethane.

As described above, the step of treating the support may be performed at a temperature of approximately 60 to 100° C., for example, at a temperature of approximately 70 to 90° C. or approximately 80 to 100° C., in order to form a substance having a co-catalytic activity within the support by proper reaction between water in the support and trialkyl aluminium.

The amount of trialkyl aluminium treated to the support by the above step is not particularly limited, but it may be performed at a molar ratio of the after-mentioned alkyl aluminoxane to trialkyl aluminium of 1:10 to 1:30, for example, 1:12 to 1:28. For proper reaction between water in the support and trialkyl aluminium, the molar ratio of alkyl aluminoxane to trialkyl aluminium is preferably 1:10 or more. In order to prevent removal of the silanol group on the surface of the support which reacts with alkyl aluminoxane, the molar ratio is preferably 1:30 or less.

The step of treating the support may be performed by adding the solvent and the support in a reactor and mixing them, and then adding trialkyl aluminium thereto and stirring the mixture at the above mentioned temperature range for approximately 30 minutes to 3 hours, for example, approximately 40 minutes to 1.5 hours or approximately 1 hour to 2 hours. However, the temperature range of the treatment step is not limited thereto.

Meanwhile, the preparation method of the supported hybrid metallocene catalyst of one embodiment includes the step of supporting alkyl aluminoxane on the support that is treated by the above mentioned method.

The alkyl aluminoxane is a cocatalyst that assists the activity of the after-mentioned metallocene compound.

The above step may be performed by mixing the support and alkyl aluminoxane and stirring the mixture in the presence or absence of a solvent.

In this regard, the alkyl aluminoxane may be one or more selected from the group consisting of methylaluminoxane, ethylaluminoxane, butylaluminoxane, and isobutylaluminoxane.

The loading amount of alkyl aluminoxane that is loaded on the support by the above step may be approximately 6 to 20 mmol/g, for example, approximately 8 to 18 mmol/g or approximately 6 to 15 mmol/g, based on 1 g of the support. Considering contribution of alkyl aluminoxane to the catalytic activity, the loading amount is preferably controlled within the above mentioned range.

In the preparation method of one embodiment, as described above, the support having a predetermined water content is used, and a portion of water may react with trialkyl aluminium in the prior step. The rest of water in the support and the hydroxy group (or silanol group) on the surface of support arising therefrom reacts with the cocatalyst alkyl aluminoxane. Finally, the cocatalyst is properly supported on the surface of support. The supported catalyst obtained by the method of one embodiment is able to show more excellent catalytic activity.

In the supporting step, a solvent may be used to facilitate contact of the support with alkyl aluminoxane, or the reaction may be allowed in the absence of a solvent.

The solvent may include aliphatic hydrocarbons such as hexane, pentane, and heptane; aromatic hydrocarbons such as toluene and benzene; chlorine-substituted hydrocarbons such as dichloromethane; ethers such as diethyl ether and tetrahydrofuran (THF); all common organic solvents such as acetone and ethyl acetate. For example, the solvent may be hexane, heptanes, toluene or dichloromethane.

The supporting step may be performed at approximately 40 to 80° C., for example, at approximately 40 to 70° C. or approximately 50 to 80° C. in order to effectively support the cocatalyst by proper reaction between the hydroxy group (or silanol group) on the surface of the support and the cocatalyst alkyl aluminoxane.

Meanwhile, the preparation method of the supported hybrid metallocene catalyst of one embodiment includes the step of supporting a metallocene compound on the alkyl aluminoxane-supported support.

The metallocene compound is a main catalyst component that shows the catalytic activity, together with the above mentioned alkyl aluminoxane.

The above step may be performed by mixing and stirring the support and the metallocene compound in the presence of a solvent.

In this regard, the loading amount of the metallocene compound that is loaded on the support by the above step may be approximately 0.1 to 0.5 mmol/g, for example, approximately 0.1 to 0.3 mmol/g or approximately 0.12 to 0.4 mmol/g, based on 1 g of the support. Considering contribution of the metallocene compound to the catalytic activity, the loading amount is preferably controlled within the above mentioned range.

Further, the step of supporting the metallocene compound may performed at a temperature of approximately 0 to 100° C., for example, at a temperature of approximately 10 to 90° C., approximately 20 to 80° C. or approximately 30 to 70° C. in terms of improving process efficiency.

In this regard, any known metallocene compound may be used as the metallocene compound without limitation, and for example, it may be one or more selected from the group consisting of the following Chemical Formulae 1 to 3:

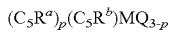 [Chemical Formula 1]

wherein M is a Group 4 transition metal;

$(C_5R^a)$ and $(C_5R^b)$ are each independently a Group 14 metalloid, cyclopentadienyl ligand that is substituted with one or more selected from the group consisting of hydrogen, alkyl, cycloalkyl, aryl, alkenyl, alkylaryl, arylalkyl, arylalkenyl and hydrocarbyl, or a cyclopentadienyl ligand, in which two neighboring carbon atoms in $C_5$ are connected to each other through hydrocarbyl to form one or more rings having 4 to 16 carbon atoms;

Q is a halogen atom, alkyl, alkenyl, aryl, alkylaryl, arylalkyl or alkylidene;

p is 0 or 1;

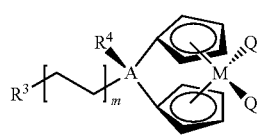 [Chemical Formula 2]

wherein M is a Group 4 transition metal;

$R^3$ and $R^4$ are each independently hydrogen, alkyl having 1 to 20 carbon atoms, alkenyl having 2 to 20 carbon atoms, aryl having 6 to 20 carbon atoms, alkylaryl having 7 to 40 carbon atoms, arylalkyl having 7 to 40 carbon atoms, alkylsilyl having 1 to 20 carbon atoms, arylsilyl having 6 to 20 carbon atoms, methoxymethyl, t-butoxymethyl, tetrahydropyranyl, tetrahydrofuranyl, 1-ethoxyethyl, 1-methyl-1-methoxyethyl, or t-butyl;

A is alkylene having 2 to 4 carbon atoms, alkylsilicon having 1 to 4 carbon atoms, alkylgermanium having 1 to 4 carbon atoms, alkylphosphine having 1 to 4 carbon atoms or alkylamine having 1 to 4 carbon atoms;

Q is each independently a halogen atom, alkyl having 1 to 20 carbon atoms, alkenyl having 2 to 10 carbon atoms, alkylaryl having 7 to 40 carbon atoms, arylalkyl having 7 to 40 carbon atoms, aryl having 6 to 20 carbon atoms, substituted or unsubstituted alkylidene having 1 to 20 carbon atoms, substituted or unsubstituted amino group, alkylalkoxy having 2 to 20 carbon atoms or arylalkoxy having 7 to 40 carbon atoms;

m is an integer of 0 to 10;

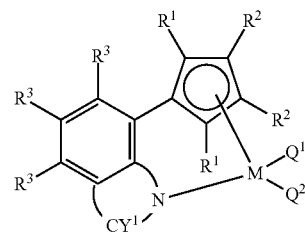 [Chemical Formula 3]

wherein $R^1$ and $R^2$ are each independently hydrogen, alkyl having 1 to 20 carbon atoms, alkenyl having 2 to 20 carbon atoms, aryl having 6 to 20 carbon atoms, silyl having 6 to 20 carbon atoms, alkylaryl having 7 to 20 carbon atoms, arylalkyl having 7 to 20 carbon atoms or a Group 14 metalloid substituted with hydrocarbyl; $R^1$ and $R^2$, or two $R^2$s may be connected to each other by alkylidine containing alkyl having 1 to 20 carbon atoms or aryl having 6 to 20 carbon atoms so as to form a ring;

$R^3$s are each independently hydrogen, a halogen atom, alkyl having 1 to 20 carbon atoms, alkenyl having 2 to 20 carbon atoms, aryl having 6 to 20 carbon atoms, alkylaryl having 7 to 20 carbon atoms, arylalkyl having 7 to 20 carbon atoms, alkoxy having 1 to 20 carbon atoms, aryloxy having 6 to 20 carbon atoms or amido; two or more of $R^3$s may be connected to each other so as to form an aliphatic or aromatic ring;

$CY^1$ is a substituted or unsubstituted aliphatic or aromatic ring, in which the substituent in $CY^1$ is a halogen atom, alkyl having 1 to 20 carbon atoms, alkenyl having 2 to 20 carbon atoms, aryl having 6 to 20 carbon atoms, alkylaryl having 7 to 20 carbon atoms, arylalkyl having 7 to 20 carbon atoms, alkoxy having 1 to 20 carbon atoms, aryloxy having 6 to 20 carbon atoms, or amido; when a plurality of substituents are present, two or more of the substituents may be connected to each other so as to form an aliphatic or aromatic ring;

M is a Group 4 transition metal; and $Q^1$ and $Q^2$ are each independently halogen, alkyl having 1 to 20 carbon atoms, alkenyl having 2 to 20 carbon atoms, aryl having 6 to 20 carbon atoms, alkylaryl having 7 to 20 carbon atoms, arylalkyl having 7 to 20 carbon atoms, alkylamido having 1 to 20 carbon atoms, arylamido having 6 to 20 carbon atoms or alkylidene having 1 to 20 carbon atoms.

In this regard, at least any one of hydrogens present in $R^a$ and $R^b$ of the metallocene compound represented by Chemical Formula 1 may be substituted with any one or more of the radicals represented by the following Chemical Formula a, Chemical Formula b and Chemical Formula c:

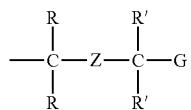
[Chemical Formula a]

wherein Z is oxygen or sulfur;

R and R' are each independently selected from hydrogen, alkyl, cycloalkyl, aryl, alkenyl, alkylaryl, arylalkyl and arylalkenyl, and two R's may be connected to each other so as to form a ring;

G is alkoxy, aryloxy, alkylthio, arylthio, phenyl and substituted phenyl, and may be connected to R' so as to form a ring;

if Z is sulfur, G is alkoxy or aryloxy;

if G is alkylthio, arylthio, phenyl or substituted phenyl, Z is oxygen;

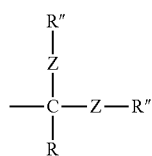
[Chemical Formula b]

wherein Z is oxygen or sulfur, and at least any one of two Zs is an oxygen atom;

R and R″ are each independently hydrogen, alkyl, cycloalkyl, aryl, alkenyl, alkylaryl, arylalkyl or arylalkenyl;

R may be connected to R″ so as to form a ring;

if two R″s are not hydrogen radicals, they may be connected to each other so as to form a ring;

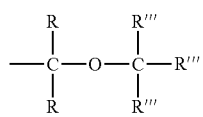
[Chemical Formula c]

wherein R and R' are each independently hydrogen, alkyl, cycloalkyl, aryl, alkenyl, alkylaryl, arylalkyl, or arylalkenyl;

two adjacent R‴ s may be connected to each other so as to form a ring; if at least one of R‴s is a hydrogen radical, all R‴s are not hydrogen, and if at least one of R‴s is hydrogen, all Rs are not hydrogen.

Further, the compound represented by Chemical Formula 2 may be, for example, a compound represented by the following Chemical Formula 4.

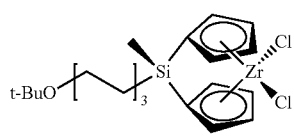
[Chemical Formula 4]

Further, the compound represented by Chemical Formula 3 may be a compound represented by the following Chemical Formula 5 or Chemical Formula 6 as preferred compounds to control the electronic or steric environment around the metal.

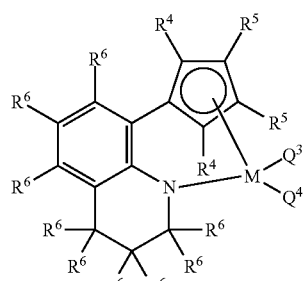
[Chemical Formula 5]

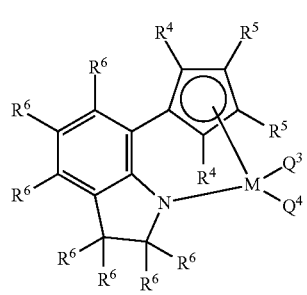
[Chemical Formula 6]

wherein $R^4$ and $R^5$ are each independently hydrogen, alkyl having 1 to 20 carbon atoms, aryl having 6 to 20 carbon atoms or silyl having 6 to 20 carbon atoms;

$R^6$ is each independently hydrogen, alkyl having 1 to 20 carbon atoms, alkenyl having 2 to 20 carbon atoms, aryl having 6 to 20 carbon atoms, alkylaryl having 7 to 20 carbon atoms, arylalkyl having 7 to 20 carbon atoms, alkoxy having 1 to 20 carbon atoms, aryloxy having 6 to 20 carbon atoms, or amido having 6 to 20 carbon atoms; two or more of $R^6$s may be connected to each other so as to form an aliphatic or aromatic ring;

$Q^3$ and $Q^4$ are each independently halogen, alkyl having 1 to 20 carbon atoms, alkylamido having 1 to 20 carbon atoms or arylamido having 6 to 20 carbon atoms; and M is a Group 4 transition metal.

More preferably, the compound represented by Chemical Formula 3 may include compounds represented by the following Chemical Formula 7:

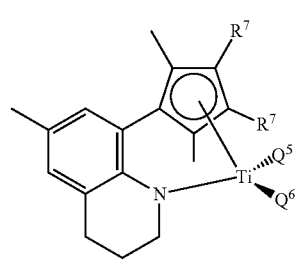
[Chemical Formula 7]

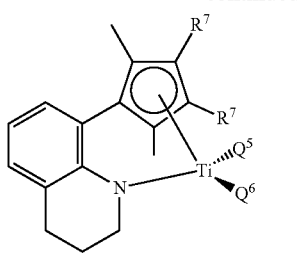
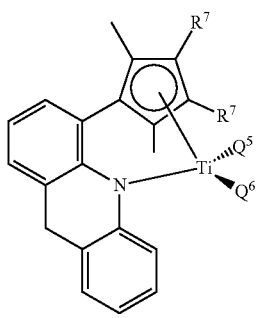
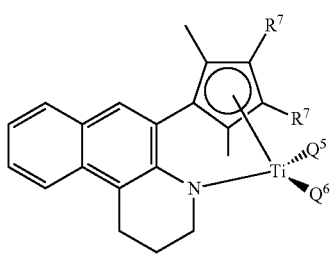
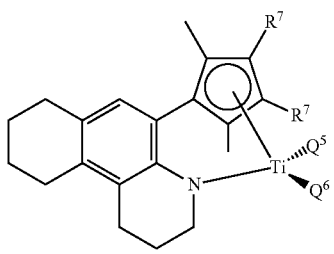
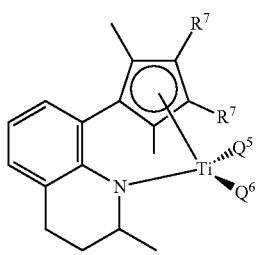
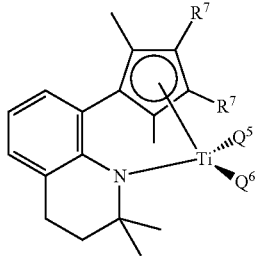

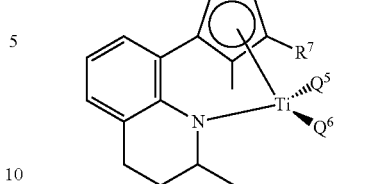
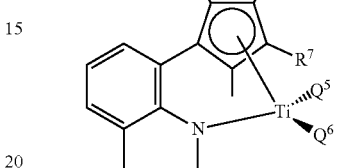
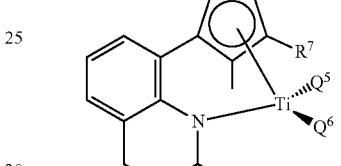
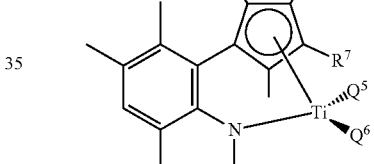
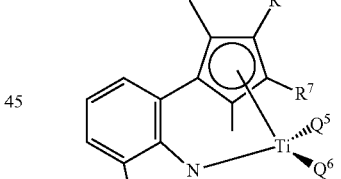

wherein $R^7$ is each independently hydrogen or methyl; $Q^5$ and $Q^6$ are each independently methyl, dimethylamido or chloride.

Specifically, in the metallocene compound represented by Chemical Formula 3, the metal position is connected by a cyclopentadienyl ligand, to which an amido group is introduced in a cyclic form via a phenylene bridge, and thus there is tendency that structurally the Cp-M-N angle keeps narrow, while the $Q^1$-M-$Q^2$ angle for approach of the monomers keeps wide.

Further, to be contrary with the CGC structure having a linkage via a silicon bridge, the compound structure represented by Chemical Formula 2 has a stable and rigid pentagon ring structure having metal positions with a Cp, a phenylene bridge, and a nitrogen atom due to the cyclic form. That is, the nitrogen atom of the amido group is connected with the phenylene bridge by two bonds in a cyclic form, so that the complex has a more rigid structure. Further, many different substituents can be introduced onto the cyclopentadienyl ring and quinoline ring, which controls the electronic or steric environment around the metal so as to control the structure and physical properties of polyolefins to be produced. Therefore, the compound represented by Chemical Formula 2 can be used to prepare a catalyst for polymerization of olefin monomers, but is not limited thereto. It is applicable to all fields in which the transition metal compound can be used.

As such, the preparation method of the supported hybrid metallocene catalyst of one embodiment may be performed by a method including the steps of treating the support having a predetermined water content with trialkyl aluminum at a predetermined temperature; supporting alkyl aluminoxane on the support; and supporting the metallocene compound on the alkyl aluminoxane-supported support. In addition to the above mentioned steps, the preparation method may further include the step typically performed in the art before or after each step, and the preparation method of one embodiment is not limited to the above mentioned steps.

Meanwhile, according to another embodiment of the present invention, provided is a supported hybrid metallocene catalyst prepared by the above mentioned method. This supported catalyst can show excellent catalytic activity of, for example, 15 kg/g support or more, specifically, 15 to 40 kg/g support, and can be very suitably applied in the preparation of polyolefins by polymerization of olefin-based monomers.

According to still another embodiment of the present invention, provided is a preparation method of polyolefins using the supported hybrid metallocene catalyst. This preparation method may include the step of polymerizing olefin-based monomers in the presence of the supported catalyst.

In this regard, the supported hybrid metallocene catalyst can be used as it is in the polymerization. The catalyst can be also used as a pre-polymerized catalyst as prepared through a contact reaction with the olefin-based monomer. For example, a separate catalyst can be put in contact with an olefin-based monomer such as ethylene, propylene, 1-butene, 1-hexene, or 1-octene so as to prepare a pre-polymerized catalyst for use as a catalyst.

The catalyst may be diluted with a solvent, such as aliphatic hydrocarbon solvents having 5 to 12 carbon atoms, (e.g., pentane, hexane, heptane, nonane, decane, or their isomers; aromatic hydrocarbon solvents, such as toluene or benzene; or chlorine-substituted hydrocarbon solvents, such as dichloromethane or chlorobenzene, and then injected into a reactor. At this time, the solvent is preferably treated with a small amount of alkyl aluminum to eliminate a trace of water or air which functions as catalyst poison.

Meanwhile, a slurry process, a gas phase process, or a combination thereof may be applied to the polymerization process, and it is preferably conducted at a reaction temperature of approximately 50 to 150° C.

At this time, the olefin-based monomer may be selected according to the type of polyolefin to be prepared, and preferably one or more olefin-based monomers selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetracene, 1-hexadecene, 1-itocene, norbornene, norbornadiene, ethylidene norbornene, phenyl norbornene, vinyl norbornene, dicyclopentadiene, 1,4-butadiene, 1,5-pentadiene, 1,6-hexadiene, styrene, alpha-methyl styrene, divinylbenzene, and 3-chloromethyl styrene.

Hereinafter, the preferred Examples are provided for better understanding. However, these Examples are for illustrative purposes only, and the invention is not intended to be limited by these Examples.

Preparation Example 1

Preparation of Metallocene Compound 6-chlorohexanol was used to prepare tBu-O—$(CH_2)_6$—Cl according to the known method (Tetrahedron Lett. 2951 (1988)), and reacted with NaCp to yield tBu-O—$(CH_2)_6$—$C_5H_5$ (yield: 60%; and b.p.: 80° C./0.1 mmHg). Zirconium was attached in the same manner to yield [tBu-O—$(CH_2)_6$—$C_5H_4]_2ZrCl_2$ (yield: 92%):

$^1$H NMR (300 MHz, $CDCl_3$): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H);

$^{13}$C NMR ($CDCl_3$): 135.09, 116.66, 112.28, 72.42, 61.52, 30.66, 30.61, 30.14, 29.18, 27.58, 26.00.

Preparation Example 2

Preparation of Metallocene Compound

At room temperature, to a 10 L reactor were added 50 g of Mg(s) and then 300 ml of THF. 0.5 g of $I_2$ was added to the reactor, which was then kept at 50° C. Once the reactor temperature gets stable, 250 g of 6-t-buthoxyhexyl chloride was added to the reactor at a rate of 5 ml/min through a feeding pump. With the addition of 6-t-buthoxyhexyl chloride, the reactor temperature was increased by approximately 4 to 5° C. The reactor was stirred for 12 hours while 6-t-buthoxyhexyl chloride was continuously added. The 12-hour reaction resulted in a black solution. 2 ml of the black solution was collected and mixed with water to form an organic layer, which was then subjected to $^1$H-NMR to identify 6-t-buthoxyhexane. The analysis of the 6-t-buthoxyhexane showed that the Grignard reaction took place actively, thereby synthesizing 6-t-buthoxyhexyl magnesium chloride.

500 g of $MeSiCl_3$ and 1 L of THF were put in the reactor, which was then cooled down to −20° C. 560 g of 6-t-buthoxy-hexyl magnesium chloride was added to the reactor at a rate of 5 ml/min through a feeding pump. After feeding of the Grignard reagent, the reactor was stirred for 12 hours while gradually warmed up to room temperature. The completion of the 12 hours reaction left a white $MgCl_2$ salt. The salt product was combined with 4 L of hexane and then subjected to a labdori machine to leave a salt-free filtrate. The filtrate was added to the reactor and removed of hexane at 70° C. to remain a light yellowish liquid. The liquid was analyzed through $^1$H-NMR to identify methyl(6-t-buthoxy hexyl)dichlorosilane as the desired product.

$^1$H-NMR ($CDCl_3$): 3.3 (t, 2H), 1.5 (m, 3H), 1.3 (m, 5H), 1.2 (s, 9H), 1.1 (m, 2H), 0.7 (s, 3H)

1.2 mol (150 g) of tetramethyl cyclopentadiene and 2.4 L of THF were put in a reactor, which was then cooled down to −20° C. 480 mL of n-BuLi was added to the reactor at a rate of 5 ml/min through a feeding pump. After addition of n-BuLi, the reactor was stirred for 12 hours while gradually warmed up to room temperature. After completion of the 12-hour reaction, an equivalent weight (326 g, 350 ml) of methyl(6-t-buthoxy hexyl)dichlorosilane was rapidly added to the reactor, which was then stirred for 12 hours while gradually warmed up to room temperature. The reactor was cooled down to 0° C. 2 equivalent weight of t-$BuNH_2$ was added to the reactor, which was then stirred for 12 hours while warmed up to room temperature. After the 12-hour reaction, the solution was removed of THF, combined with 4 L of hexane, and then subjected to a labdori machine to remain a salt-free filtrate. The filtrate was added to the reactor and removed of hexane at 70° C. to remain a yellowish solution. The solution was analyzed through $^1$H-NMR to identify methyl(6-t-buthoxy hexyl)(tetramethyl CpH)-t-butylaminosilane as the desired product.

10 mmol of TiCl$_3$(THF)$_3$ was rapidly added to the dilithium salt of the ligand (at −78° C.) which was synthesized from n-BuLi and dimethyl(tetramethyl CpH)-t-butylaminosilane in the THF solution. The resultant solution was gradually warmed up from −78° C. to the room temperature and stirred for 12 hours. After the 12-hour agitation, an equivalent weight (10 mmol) of PbCl$_2$ was added to the solution at room temperature, and then stirred for further 12 hours to yield a dark bluish black solution. The resultant solution was removed of THF, mixed with hexane, and then filtered out to eliminate hexane. The hexane-free filtrate thus obtained was analyzed through $^1$H-NMR to identify (tBu-O—(CH$_2$)$_6$)(CH$_3$)Si(C$_5$(CH$_3$)$_4$)(tBu-N)TiCl$_2$ as a desired product which as [methyl(6-t-buthoxyhexyl)silyl(η5-tetramethylCp)(t-Butylamido)]TiCl$_2$.

$^1$H-NMR (CDCl$_3$): 3.3 (s, 4H), 2.2 (s, 6H), 2.1 (s, 6H), 1.8~0.8 (m), 1.4 (s, 9H), 1.2 (s, 9H), 0.7 (s, 3H)

Example 1

Silica (product name: SP952X__1836, water content: 6% by weight, support surface OH group: 3.3 mmol/g support) was prepared as a support, and used as it is.

Approximately 100 ml of toluene and approximately 10 g of the silica were added to a glass reactor, mixed, and then approximately 5 mmol of triethyl aluminium (TEA1) was added thereto and the resultant solution was stirred at approximately 80° C. for approximately 1 hour to bring about a gradual reaction.

Subsequently, a methylaluminoxane (MAO) solution containing approximately 80 mmol of aluminum was added again to the glass reactor, which was reacted at approximately 60° C. overnight. The resultant solution was washed with an excessive amount of toluene to eliminate unreacted methylaluminoxane (loading amount of MAO: approximately 8 mmol/g support, molar ratio of TEA1:MAO=1:16).

To the methylaluminoxane-supported silica was added a toluene solution containing the metallocene compound according to Preparation Example 2. The resultant solution was stirred at 40° C. for approximately 1 hour to initiate the reaction. After addition of a toluene solution containing the metallocene compound according to Preparation Example 1, the resultant solution was stirred at approximately 40° C. for approximately 1 hour to initiate the reaction (loading amount of metallocene compound: approximately 0.12 mmol/g support), washed with an excessive amount of toluene, and then dried under vacuum to yield a solid powder supported hybrid metallocene catalyst.

Example 2

A supported hybrid metallocene catalyst was obtained under the same conditions and manner as in Example 1, excepting that a methylaluminoxane (MAO) solution containing approximately 120 mmol of aluminium was used instead of the methylaluminoxane (MAO) solution containing approximately 80 mmol of aluminium (loading amount of MAO: approximately 12 mmol/g support, molar ratio of TEA1:MAO=1:24).

Example 3

A supported hybrid metallocene catalyst was obtained under the same conditions and manner as in Example 1, excepting that a methylaluminoxane (MAO) solution containing approximately 140 mmol of aluminium was used instead of the methylaluminoxane (MAO) solution containing approximately 80 mmol of aluminium (loading amount of MAO: approximately 14 mmol/g support, molar ratio of TEA1:MAO=1:28).

Comparative Example 1

Silica (product name: SP952X__1836, water content: 6% by weight, support surface OH group: 3.3 mmol/g support) was prepared as a support. The silica support was dried and calcined at 600° C. for 12 hours to prepare a silica support having a water content of 1% by weight.

Approximately 100 ml of toluene and approximately 10 g of the silica were added to a glass reactor, mixed, and then the methylaluminoxane (MAO) solution containing approximately 80 mmol of aluminum was added again to the glass reactor, which was reacted at approximately 60° C. overnight. The resultant solution was washed with an excessive amount of toluene to eliminate unreacted methylaluminoxane (loading amount of MAO: approximately 8 mmol/g support, no TEA1 used).

To the methylaluminoxane-supported silica was added a toluene solution containing the metallocene compound according to Preparation Example 2. The resultant solution was stirred at 40° C. for approximately 1 hour to initiate the reaction. After addition of a toluene solution containing the metallocene compound according to Preparation Example 1, the resultant solution was stirred at approximately 40° C. for approximately 1 hour to initiate the reaction (loading amount of metallocene compound: approximately 0.12 mmol/g support), washed with an excessive amount of toluene, and then dried under vacuum to yield a solid powder supported metallocene catalyst.

Comparative Example 2

Silica (product name: SP952X__1836, water content: 6% by weight, support surface OH group: 3.3 mmol/g support) was prepared as a support, and used as it is.

Approximately 100 ml of toluene and approximately 10 g of the silica were added to a glass reactor, mixed, and then approximately 49.4 mmol of triethyl aluminium (TEA1) was added thereto and the resultant solution was stirred at room temperature (approximately 25° C.) for approximately 1 hour to bring about a gradual reaction (loading amount of TEA1 approximately 4.94 mmol/g support, no MAO used).

To the treated silica was added a toluene solution containing the metallocene compound according to Preparation Example 2. The resultant solution was stirred at approximately 40° C. for approximately 1 hour to initiate the reaction. After addition of a toluene solution containing the metallocene compound according to Preparation Example 1, the resultant solution was stirred at approximately 40° C. for approximately 1 hour to initiate the reaction (loading amount of metallocene compound: approximately 0.12 mmol/g support), washed with an excessive amount of toluene, and then dried under vacuum to yield a solid powder supported metallocene catalyst.

Comparative Example 3

Silica (product name: SP952X__1836, water content: 6% by weight, support surface OH group: 3.3 mmol/g support)

was prepared as a support, and used as it is. Approximately 100 ml of toluene and approximately 10 g of the silica were added to a glass reactor, mixed, and then approximately 49.4 mmol of triethyl aluminium (TEA1) was added thereto and the resultant solution was stirred at room temperature (approximately 25° C.) for approximately 1 hour to bring about a gradual reaction.

Subsequently, the methylaluminoxane (MAO) solution containing approximately 80 mmol of aluminum was added again to the glass reactor, which was reacted at approximately 60° C. overnight. The resultant solution was washed with an excessive amount of toluene to eliminate unreacted methylaluminoxane (loading amount of MAO: approximately 8 mmol/g support, molar ratio of TEA1:MAO=5:8).

To the methylaluminoxane-supported silica was added a toluene solution containing the metallocene compound according to Preparation Example 2. The resultant solution was stirred at 40° C. for approximately 1 hour to initiate the reaction. After addition of a toluene solution containing the metallocene compound according to Preparation Example 1, the resultant solution was stirred at 40° C. for approximately 1 hour to initiate the reaction (loading amount of metallocene compound: approximately 0.12 mmol/g support), washed with an excessive amount of toluene, and then dried under vacuum to yield a solid powder supported metallocene catalyst.

Comparative Example 4

Silica (product name: SP952X_1836, water content: 6% by weight, support surface OH group: 3.3 mmol/g support) was prepared as a support, and used as it is.

Approximately 100 ml of toluene and approximately 10 g of the silica were added to a glass reactor, mixed, and then the methylaluminoxane (MAO) solution containing approximately 80 mmol of aluminum was added again to the glass reactor, which was reacted at approximately 60° C. overnight. The resultant solution was washed with an excessive amount of toluene to eliminate unreacted methylaluminoxane (loading amount of MAO: approximately 8 mmol/g support, no TEA1 used).

To the methylaluminoxane-supported silica was added a toluene solution containing the metallocene compound according to Preparation Example 2. The resultant solution was stirred at 40° C. for approximately 1 hour to initiate the reaction.

After addition of a toluene solution containing the metallocene compound according to Preparation Example 1, the resultant solution was stirred at approximately 40° C. for approximately 1 hour to initiate the reaction (loading amount of metallocene compound: approximately 0.12 mmol/g support), washed with an excessive amount of toluene, and then dried under vacuum to yield a solid powder supported metallocene catalyst.

Comparative Example 5

Silica (product name: SP952X_1836, water content: 6% by weight, support surface OH group: 3.3 mmol/g support) was prepared as a support, and used as it is. Approximately 100 ml of toluene and approximately 10 g of the silica were added to a glass reactor, mixed, and then approximately 5 mmol of triethyl aluminium (TEA1) was added thereto and the resultant solution was stirred at room temperature (approximately 25° C.) for approximately 1 hour to bring about a gradual reaction.

Subsequently, the methylaluminoxane (MAO) solution containing approximately 80 mmol of aluminum was added again to the glass reactor, which was reacted at approximately 60° C. overnight. The resultant solution was washed with an excessive amount of toluene to eliminate unreacted methylaluminoxane (loading amount of MAO: approximately 8 mmol/g support, molar ratio of TEA1:MAO=1:16).

To the methylaluminoxane-supported silica was added a toluene solution containing the metallocene compound according to Preparation Example 2. The resultant solution was stirred at 40° C. for approximately 1 hour to initiate the reaction. After addition of a toluene solution containing the metallocene compound according to Preparation Example 1, the resultant solution was stirred at approximately 40° C. for approximately 1 hour to initiate the reaction (loading amount of metallocene compound: approximately 0.12 mmol/g support), washed with an excessive amount of toluene, and then dried under vacuum to yield a solid powder supported metallocene catalyst.

Comparative Example 6

Silica (product name: SP952X_1836, water content: 6% by weight, support surface OH group: 3.3 mmol/g support) was prepared as a support. The silica support was dried and calcined at 600° C. for 12 hours to prepare a silica support having a water content of 1% by weight.

Approximately 100 ml of toluene and approximately 10 g of the silica were added to a glass reactor, mixed, and then approximately 5 mmol of triethyl aluminium (TEA1) was added thereto and the resultant solution was stirred at approximately 80° C. for approximately 1 hour to bring about a gradual reaction.

Subsequently, the methylaluminoxane (MAO) solution containing approximately 80 mmol of aluminum was added again to the glass reactor, which was reacted at approximately 60° C. overnight. The resultant solution was washed with an excessive amount of toluene to eliminate unreacted methylaluminoxane (loading amount of MAO: approximately 8 mmol/g support, molar ratio of TEA1:MAO=1:16).

To the methylaluminoxane-supported silica was added a toluene solution containing the metallocene compound according to Preparation Example 2. The resultant solution was stirred at approximately 40° C. for approximately 1 hour to initiate the reaction. After addition of a toluene solution containing the metallocene compound according to Preparation Example 1, the resultant solution was stirred at approximately 40° C. for approximately 1 hour to initiate the reaction (loading amount of metallocene compound: approximately 0.12 mmol/g support), washed with an excessive amount of toluene, and then dried under vacuum to yield a solid powder supported metallocene catalyst.

Experimental Example

Each 20 mg of the supported catalysts prepared in Examples 1 to 3 and Comparative Examples 1 to 6 was weighed in a dry box and put in a 50 ml glass bottle, which was sealed with a rubber membrane and taken out of the dry box to make the catalyst for olefin polymerization ready.

A 2 L-metal alloy reactor that is equipped with a mechanical agitator, temperature-controllable and used under high pressure was used as a polymerization reactor.

1 L of hexane containing 0.5 mmol of triethylaluminum (TEA1) and 20 mL of 1-hexene were injected to the reactor, and then each of the supported catalysts was added thereto without contact with air. Then, a gaseous ethylene monomer was continuously added to the reactor under a pressure of 40 Kgf/cm² at 80° C. to cause the polymerization reaction for 1 hour. The polymerization reaction was terminated by stopping agitation and guiding the ethylene gas away from the reactor. Thereafter, the polymerization solvent was almost removed by filtration, and then dried in an oven at 70° C. for 4 hours to obtain ethylene polymers.

At this time, the weight of the ethylene polymer (kg) per unit weight (g) of each of the catalysts according to Examples 1 to 3 and Comparative Examples 1 to 6 was measured to calculate catalytic activity and the results are shown in the following Table 1.

Further, bulk density of the ethylene polymer prepared by using each catalyst was measured, and the results are shown in the following Table 1.

TABLE 1

| | Comparative Example | | | | | | Example | | |
|---|---|---|---|---|---|---|---|---|---|
| | 1 | 2 | 3 | 4 | 5 | 6 | 1 | 2 | 3 |
| Water content of support (wt %) | 1 | 6 | 6 | 6 | 6 | 1 | 6 | 6 | 6 |
| TEAl (mmol/g support) | — | 4.94 (treated at room temp.) | 4.94 (treated at room temp.) | — | 0.5 (treated at room temp.) | 0.5 (treated at 80° C.) | 0.5 (treated at 80° C.) | 0.5 (treated at 80° C.) | 0.5 (treated at 80° C.) |
| MAO (mmol/g support) | 8.0 (treated at 60° C.) | — | 8.0 (treated at 60° C.) | 8.0 (treated at 60° C.) | 8.0 (treated at 60° C.) | 8.0 (treated at 60° C.) | 8.0 (treated at 60° C.) | 12.0 (treated at 60° C.) | 14.0 (treated at 60° C.) |
| Activity (kg/g support) | 9.0 | 2.0 | 2.3 | 9.0 | 13.0 | 1.5 | 17.0 | 27.0 | 33.0 |
| Bulk density (g/ml) | 0.41 | 0.32 | 0.38 | 0.30 | 0.36 | 0.39 | 0.40 | 0.39 | 0.38 |

As described above, the supported hybrid metallocene catalysts of Examples 1 to 3 were those obtained by treating the support having a water content of 4 to 7% by weight with trialkyl aluminium such as TEA1 at approximately 60 to 100° C., supporting alkyl aluminoxane such as MAO on the support, and then supporting the metallocene compound thereto.

Referring to Table 1, the catalysts of Examples 1 to 3 showed excellent polymerization activity, and the ethylene polymers prepared by using the catalysts had excellent physical properties of bulk density of 0.38 g/ml or higher. Thus, the catalysts are very useful in industrial applications.

In contrast, the catalysts of Comparative Examples 1, 2 and 4 which were treated with any one of trialkyl aluminium and alkyl aluminoxane showed very low catalytic activity, compared to the catalysts of Examples 1 to 3. Referring to Comparative Examples 3 and 5, when the TEA1 treatment temperature was decreased to room temperature, an increase in the catalytic activity due to TEA1 treatment was hardly observed. The catalysts showed poor catalytic activity or the ethylene polymers prepared thereby had insufficient bulk density.

Additionally, referring to Comparative Examples 1 and 6, when the supports having low water content by calcination were used to prepare the catalysts, their catalytic activities were also very low, compared to Examples 1 to 3.

The invention claimed is:

1. A preparation method of a hybrid supported metallocene catalyst, comprising the steps of:

treating a support having a water content of 4 to 7% by weight with trialkyl aluminum at a temperature of 60 to 100° C.;
supporting an alkyl aluminoxane on the support; and
supporting a metallocene compound on the alkyl aluminoxane-supported support,
wherein the metallocene compound is one or more selected from the group consisting of the following Chemical Formulae 1 to 3:

$$(C_5R^a)_p(C_5R^b)MQ_{3-p}$$ [Chemical Formula 1]

wherein M is a Group 4 transition metal;
$(C_5R^a)$ and $(C_5R^b)$ are each independently a cyclopentadienyl ligand containing metalloid of Group 14; a cyclopentadienyl ligand that is substituted with one or more selected from the group consisting of hydrogen, alkyl, cycloalkyl, aryl, alkenyl, alkylaryl, arylalkyl, arylalkenyl and hydrocarbyl; or a cyclopentadienyl ligand, in which two neighboring carbon atoms in $C_5$ are connected to each other through hydrocarbyl to form one or more rings having 4 to 16 carbon atoms;
Q is a halogen atom, alkyl, alkenyl, aryl, alkylaryl, arylalkyl or alkylidene;
p is 0 or 1;

[Chemical Formula 2]

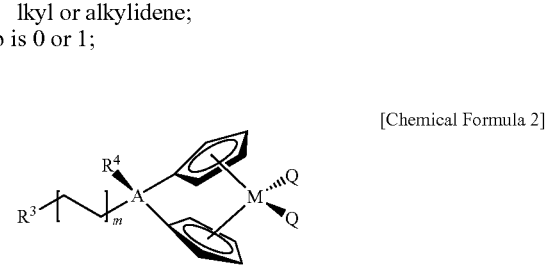

wherein M is a Group 4 transition metal;
$R^3$ and $R^4$ are each independently hydrogen, alkyl having 1 to 20 carbon atoms, alkenyl having 2 to 20 carbon atoms, aryl having 6 to 20 carbon atoms, alkylaryl having 7 to 40 carbon atoms, arylalkyl having 7 to 40 carbon atoms, alkylsilyl having 1 to 20 carbon atoms, arylsilyl having 6 to 20 carbon atoms, methoxymethyl, t-butoxymethyl, tetrahydropyranyl, tetrahydrofuranyl, 1-ethoxyethyl, 1-methyl-1-methoxyethyl, or t-butyl;
A is alkylene having 2 to 4 carbon atoms, alkylsilicon having 1 to 4 carbon atoms, alkylgermanium having 1 to 4 carbon atoms, alkylphosphine having 1 to 4 carbon atoms or alkylamine having 1 to 4 carbon atoms;

Q is each independently a halogen atom, alkyl having 1 to 20 carbon atoms, alkenyl having 2 to 10 carbon atoms, alkylaryl having 7 to 40 carbon atoms, arylalkyl having 7 to 40 carbon atoms, aryl having 6 to 20 carbon atoms, substituted or unsubstituted alkylidene having 1 to 20 carbon atoms, substituted or unsubstituted amino group, alkylalkoxy having 2 to 20 carbon atoms or arylalkoxy having 7 to 40 carbon atoms;

m is an integer of 0 to 10;

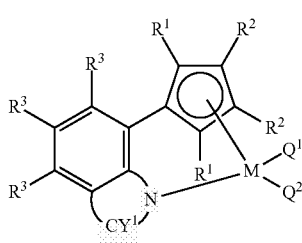

[Chemical Formula 3]

wherein $R^1$ and $R^2$ are each independently hydrogen, alkyl having 1 to 20 carbon atoms, alkenyl having 2 to 20 carbon atoms, aryl having 6 to 20 carbon atoms, silyl having 6 to 20 carbon atoms, alkylaryl having 7 to 20 carbon atoms, arylalkyl having 7 to 20 carbon atoms or a metalloid in Group 14 substituted with hydrocarbyl; $R^1$ and $R^2$, or two $R^2$s are connected to each other by alkylidine containing alkyl having 1 to 20 carbon atoms or aryl having 6 to 20 carbon atoms so as to form a ring;

$R^3$s are each independently hydrogen, a halogen atom, alkyl having 1 to 20 carbon atoms, alkenyl having 2 to 20 carbon atoms, aryl having 6 to 20 carbon atoms, alkylaryl having 7 to 20 carbon atoms, arylalkyl having 7 to 20 carbon atoms, alkoxy having 1 to 20 carbon atoms, aryloxy having 6 to 20 carbon atoms or amido; two or more of $R^3$s are connected to each other so as to form an aliphatic or aromatic ring;

$CY^1$ is a substituted or unsubstituted aliphatic or aromatic ring, in which the substituent in $CY^1$ is a halogen atom, alkyl having 1 to 20 carbon atoms, alkenyl having 2 to 20 carbon atoms, aryl having 6 to 20 carbon atoms, alkylaryl having 7 to 20 carbon atoms, arylalkyl having 7 to 20 carbon atoms, alkoxy having 1 to 20 carbon atoms, aryloxy having 6 to 20 carbon atoms, or amido; when a plurality of substituents are present, two or more of the substituents are connected to each other so as to form an aliphatic or aromatic ring;

M is a Group 4 transition metal; and $Q^1$ and $Q^2$ are each independently halogen, alkyl having 1 to 20 carbon atoms, alkenyl having 2 to 20 carbon atoms, aryl having 6 to 20 carbon atoms, alkylaryl having 7 to 20 carbon atoms, arylalkyl having 7 to 20 carbon atoms, alkylamido having 1 to 20 carbon atoms, arylamido having 6 to 20 carbon atoms or alkylidene having 1 to 20 carbon atoms.

2. The preparation method according to claim 1, wherein the support includes a hydroxy group of 2 to 4 mmol/g on the surface.

3. The preparation method according to claim 1, wherein a molar ratio of trialkyl aluminium and alkyl aluminoxane is 1:10 to 1:30.

4. The preparation method according to claim 1, wherein a loading amount of alkyl aluminoxane on the support is 6 to 20 mmol/g.

5. The preparation method according to claim 1, wherein a loading amount of the metallocene compound on the support is 0.1 to 0.5 mmol/g.

6. The preparation method according to claim 1, wherein the step of supporting alkyl aluminoxane is performed at a temperature of 40 to 80° C.

7. The preparation method according to claim 1, wherein the support is one or more selected from the group consisting of silica, silica-alumina, and silica-magnesia.

8. The preparation method according to claim 1, wherein the trialkyl aluminium is one or more selected from the group consisting of trimethyl aluminium, triethyl aluminium, and tributyl aluminium.

9. The preparation method according to claim 1, wherein the alkyl aluminoxane is one or more selected from the group consisting of methylaluminoxane, ethylaluminoxane, butylaluminoxane, and isobutylaluminoxane.

* * * * *